Jan. 12, 1943.  R. F. SCHUTZ  2,308,112
SPECTACLE CASE
Filed Dec. 1, 1939

INVENTOR
Raymond F. Schutz
by Parker, Rockwell & Farmer
ATTORNEYS

Patented Jan. 12, 1943

2,308,112

UNITED STATES PATENT OFFICE 2,308,112

SPECTACLE CASE

Raymond F. Schutz, Buffalo, N. Y.

Application December 1, 1939, Serial No. 307,137

2 Claims. (Cl. 206—6)

This invention relates to improvements in pocket or portable cases for carrying and protecting eyeglasses or spectacles when not in use.

One object of my invention is to produce a practical and desirable protecting case for spectacles or eyeglasses having effective but simple and inexpensive means for cushioning or yieldingly supporting and confining the spectacles or eyeglasses in the case so as to prevent them from injurious shocks or impacts due to rough or careless handling or dropping of the case.

Other objects of the invention are to provide such a protecting case which is of appealing and attractive appearance; in which the supporting or cushioning means are constructed as an insert which can be made at minimum expense and with minimum labor, and inserted as a finished insert in the case; and also to provide a practical and desirable double case for carrying and properly protecting two pairs of eyeglasses or spectacles.

In this specification, the term "spectacles" is employed not only to designate eyeglasses of the type commonly called "spectacles," but also to include nose glasses or other eyeglasses except where the context makes it clear that spectacles equipped with side bows or members for holding them on the wearer are intended.

Further objects and advantages of the invention will appear from the following specification of the preferred embodiment of the invention, shown in the accompanying drawing, and the novel features of the invention are set forth in the appended claims.

Figure 1:
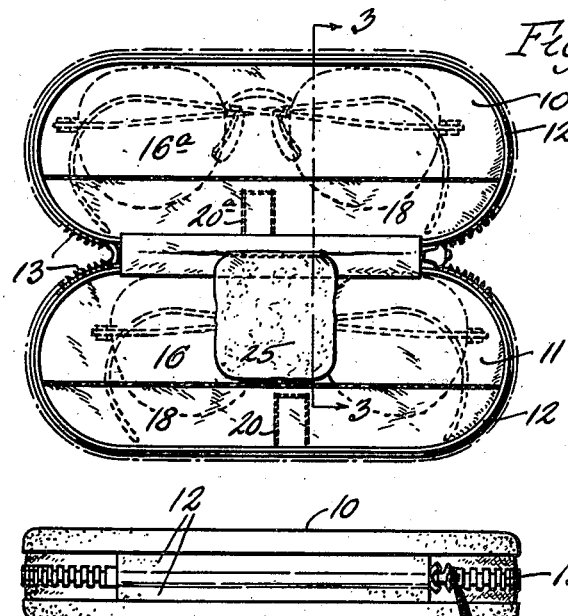
Fig. 1 is a plan view of an open double spectacles case embodying my invention.

The spectacles case as illustrated in the drawing comprises two sections having opposite or top and bottom walls 10 and 11 and peripheral rims or flanges 12, which are hinged or movably connected to each other at one side of the case and are provided with cooperating or interlocking fastener members 13, preferably of the type popularly known as "zipper" fasteners, for releasably holding the case closed. The walls 10 and 11 of the case may be made of leather or analogous more or less flexible sheet material, and the rims 12 carrying the cooperating fastener elements may be made of suitable flexible material and braced or reinforced by relatively stiff inner flanges to support the peripheral portions of the case against collapse or compression. However, my improvements are not restricted to use in cases of the particular construction herein disclosed, and the case itself may be of any other suitable construction, either of the more or less flexible type such as just mentioned, or of the type in common use at the present time, which are made with more or less rigid metal walls and have a cover which is held closed by a spring hinge or the like.

At least the hollow body or one section of the case is furnished with means for cushioning or yieldingly supporting the spectacles in the case. These means preferably comprise an insert or unit of the following construction which is placed and secured in the case.

15 represents a thin disk or plate of relatively light, stiff material, such for example as cardboard, fiberboard or the like, which substantially corresponds in shape and size with the internal, peripheral shape of the case body or section. A piece 16 of moiré silk, velvet or other soft or pliable sheet material which will provide an attractive, interior bottom finish or lining for the case, covers the upper or inner face of the disk 15, and preferably a pad of cotton batting 17 or other suitable padding material is confined between the cover piece 16 and the disk, so as to provide a cushion or yielding bottom or support in the case on which the spectacles are adapted to rest. Extending lengthwise of the case over the cover piece 16 is a relatively narrow retaining ribbon or strip 18, preferably of flexible sheet material of the same kind or appearance as the cover piece 16. This ribbon is secured in place at its ends and preferably also at its forward or outer edge portion and about midway between its ends so as to provide between the cover piece 16 and the retaining ribbon, two separate pockets or compartments into which the lenses of the spectacles are adapted to be inserted so that the spectacles will be retained in place on the yielding supporting pad or cushion and more or less confined or prevented from shifting in the case.

Figure 7:
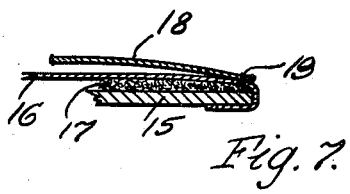
Figure 3:
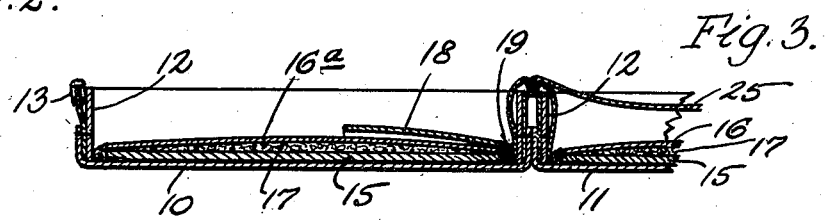
Fig. 3 is a fragmentary, transverse section, enlarged, of the case on line 3—3, Fig. 1.
Figure 4:
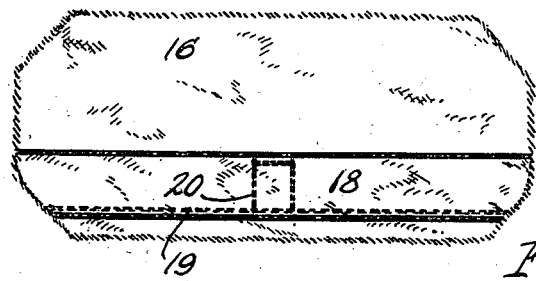
Fig. 4 is a plan view of the cover piece and attached retaining ribbon before application to the insert disk.

This insert pad or cushion can be conveniently and inexpensively made by cutting a whole piece or length of the silk, velvet or other material to be used, of whatever width it may be made, into pieces of proper size for covering the disk 15, and cutting a long narrow ribbon of the same width as the retaining strip 18 into proper lengths to make the retaining ribbons 18, and then stitching or sewing the ribbon 18 along one of its lengthwise edges at 19 to the cover piece 16 and also sewing or stitching the ribbon at 20 substantially midway between its ends to the cover piece. Thus, the usual selvage or finished edge of the narrow ribbon forms the inner or rear edge of the lens pockets and other finishing of this edge is unnecessary. After the retaining ribbon has been stitched to the cover piece 16, the latter is stretched over and secured on the disk 15 over the padding, as for instance by turning the marginal portions of the cover piece over the edges of the disk 15, and pasting or cementing them to the back or underside of the disk 15, as represented in Fig. 7, the ends of the retaining ribbon also being similiarly turned over the ends of the disk and fastened, as by cementing or otherwise. It is not necessary to secure the retaining ribbon along its outer edge or along the bottom edge of pockets but the bottoms of the pockets may be left open.

Figure 6:
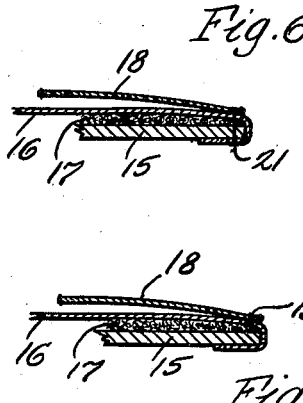
Figs. 6, 7 and 8 are similar sectional views showing slightly different ways of securing the cover piece and retaining ribbon on the insert disk.
Figure 2:
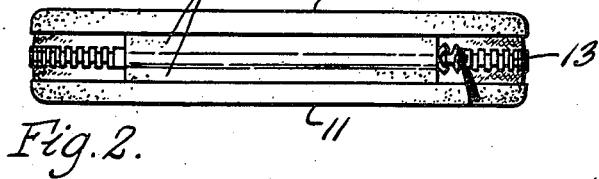
Fig. 2 is a rear edge elevation of the same closed.
Figure 5:
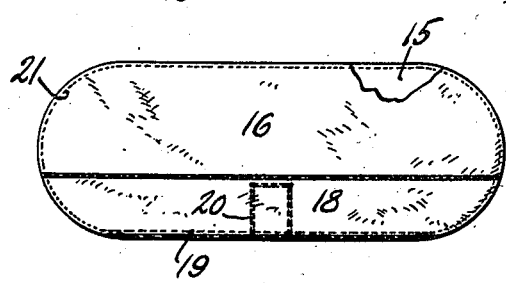
Fig. 5 is a plan view of the finished insert, out of the case.

Instead of cementing or pasting the turned-over margins of the cover piece to the underside of the disk 15, they and the ends of the pocket ribbon can be turned over the edges of the disk 15 and secured thereto by stitching 21, passing through the rim of the disk and folded portions of the cover piece and ribbon embracing the edges of the disk, as shown in Figs. 5 and 6.

Figure 8:
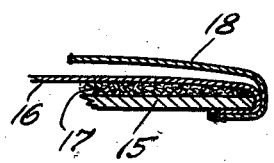

If preferred, the forward or outer edge of the retaining ribbon need not be stitched to the cover piece preparatory to securing the latter on the disk, but these edges of both the cover piece 16 and the ribbon can be turned over the corresponding edge of the disk and cemented or otherwise attached on the underside of the disk, as represented in Fig. 8. Whether the pocket ribbon is applied and secured in one or another of the ways mentioned, the inner, open edge of the pockets will have a finished edge provided by the usual selvage of the ribbon. Since the marginal portions of the cover piece are turned over and secured on the underside of the disk 15, it is not necessary for these edges to be selvage or finished edges, and the cover piece therefore can be cut from whole-piece or yard material of whatever width it may be made instead of being made from a ribbon of sufficient width to cover the disk, which would be more expensive than cover pieces cut from the usual whole-piece material. After the padded or cushioned insert has been made, as explained, it can be placed and secured in the case simply by cementing it to the interior face of the bottom wall of the case or fastening it in the case in any suitable manner.

The case shown in the drawing is a double case adapted for holding or carrying two pairs of glasses or spectacles, and the cover section as well as the lower or body section is provided with a padded insert or cushion 16a similar to that in the body section, and which may be made in the same manner, but the insert in the cover section is preferably arranged so its pockets open in the same direction as the pockets of the body insert, that is, toward the rear of the case, when open, so that when the case is closed the two pairs of spectacles will more or less nest in reversed relation to each other. This arrangement permits the case to be shallower than it would otherwise have to be. The stitchings 20 and 20a separating the pockets of the two inserts are also preferably staggered, or out of register with each other, as shown in Fig. 1, so as to hold the nose pieces of the two pairs of spectacles out of register, whereby they will better nest or interfit in the closed case.

It should be understood, however, that the insert or cushion for yieldingly supporting the spectacles in the case, constructed as described is not restricted to use in cases for two pairs of spectacles, but cases for a single pair of spectacles can be made with only one cushioned or padded insert secured in the lower section or body of the case. In such a single case the cover section or top of the case may be simply lined with a piece of silk, velvet or other desired lining material, which may be material of the same kind as that used for the cover piece of the cushion insert in the case body.

The double case shown is preferably equipped with a flap 25 which is secured at one edge in the case at its hinged side to adapt the flap to extend between the nose pieces or bridges of the two pairs of spectacles and prevent them from striking or rubbing against each other. This flap may be made of velvet, chamois skin or other suitable, soft, flexible material, and it may be attached to the usual hinge cover-piece or secured in the case in any other suitable way.

The described construction with cooperating fastener elements on the case sections for holding them closed is desirable for double cases, as it eliminates the danger present in cases of the usual rigid construction having snap covers, of possible injury to the spectacles by one pair striking the other in the closing of the case.

I claim as my invention:

1. A safety supporting case for carrying and protecting spectacles, which comprises a relatively flat and shallow elongated container having a cover hinged along one long edge thereof to open sidewise, a relatively thin padded cushion element of a size and shape to be received within said container and extend substantially from end to end thereof, confined in the bottom zone thereof in face to face relation to the bottom wall of said container, and having a generally flat, resilient upper face, and a ribbon of nonmetallic, soft, flexible sheet material extending over and in face to face relation to the upper face of said element, adjacent and along an edge thereof approximately parallel to the hinged edge of said cover, said ribbon being secured at its end and midlength portions to said element, and being unattached along a side edge thereof between its secured portions sufficiently to removably receive beneath it and confine against the cushion face of said element, the lenses of a pair of spectacles, and cushion said lenses against injury from blows to which the case containing the spectacles may be subjected.

2. A cushion insert unit for a safety spectacles carrying and protecting case of a relatively flat, elongated and shallow form having a cover hinged along one long side thereof to open sidewise, said unit comprising a thin plate member of a size and shape to be received within said case and confined in the bottom zone thereof in face to face relation to the bottom wall of said case, a relatively thin pad of soft yielding material disposed against the upper face of said member, and having its marginal zone secured to the marginal zone of said member and maintained approximately taut on said plate member, and a ribbon of non-metallic, soft, pliable sheet material disposed lengthwise along the upper face of said pad in face to face relation thereto, adjacent one long side of the case containing the unit, said ribbon having a width decidedly less than the corresponding width of said member and being secured at its end and midlength portions to said pad, but being unattached along a side edge sufficiently to form with said pad pockets in which the lenses of a pair of spectacles may be removably received, confined to said member, and cushioned against injury from blows to which the case equipped with said unit and containing the spectacles may be subjected.

RAYMOND F. SCHUTZ.